March 4, 1969  N. J. HARRICK  3,431,411
INFRARED SPECTRA OF POWDERS BY MEANS OF INTERNAL
REFLECTION SPECTROSCOPY
Filed May 28, 1964
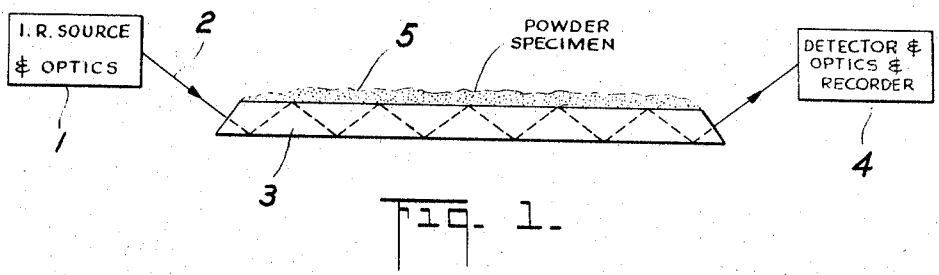
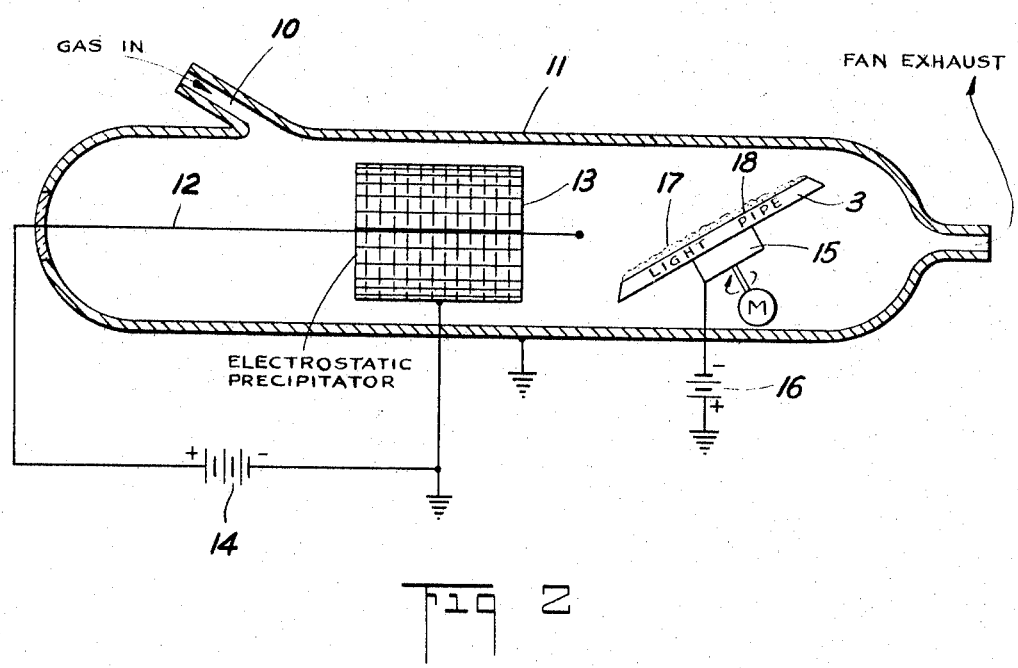
INVENTOR.
N. J. HARRICK
BY
AGENT United States Patent Office 3,431,411
Patented Mar. 4, 1969

3,431,411
INFRARED SPECTRA OF POWDERS BY MEANS OF INTERNAL REFLECTION SPECTROSCOPY
Nicolas J. Harrick, Ossining, N.Y., assignor to North American Philips Co., Inc., New York, N.Y., a corporation of Delaware
Filed May 28, 1964, Ser. No. 370,914
U.S. Cl. 250—43.5  2 Claims
Int. Cl. G01h 23/12

ABSTRACT OF THE DISCLOSURE

A method is described for obtaining the infrared optical spectra of solids in the form of powdered samples using internal reflection spectroscopy. It is unexpectedly found that the powders do not scatter the infrared light even though a comparable transmission measurement would result in a high degree of scattering.

This invention relates to infrared spectrochemical analysis.

Infrared spectroscopy has become a common tool in performing analyses in practically all technical areas. The underlying basis is the fact that many substances including practically all organic substances possess selective absorption at certain frequencies in the infrared portion of the electromagnetic spectrum. In operation, a spectrometer is used to determine the percentage of absorption of transmission of a sample of the substance at a series of narrow frequency intervals throughout a chosen part of the spectrum. A plot of these transmission or absorption values versus frequency or wavelength constitutes the infrared spectrum which is characteristic of the sample being studied and may be used as a way of identifying the sample in the same manner that others of its properties are employed. The samples are usually in the form of gases or vapors, liquids or solutions, and sometimes solids. In the usual practice, the vapor or liquid sample is provided within an absorption cell which consists of a tube or other enclosure provided at opposite ends with infrared transparent cell windows through which the infrared beam enters and leaves the cell after undergoing absorption in the sample. The study of samples in the form of solids has been much more difficult and less successful, especially those solids which are insoluble in a suitable solvent from which a liquid solution or specimen can be prepared. One of the difficulties encountered with a solid is that of opacity. That is, the solid normally will absorb most of the infrared radiation so that very little transmitted radiation remains for actuating the detector. Efforts to avoid this opacity problem in the transmission technique employ a very thin sample of the solid which may be provided by melting a portion of the sample onto a suitable transparent support or by evaporating the sample to form a thin film on a transparent support. Other techniques involve, as mentioned earlier, the preparation of a liquid sample by dissolving the solid in a suitable solvent. The latter involves the further difficulty that the solvent itself contributes absorption bands which may interfere with the desired spectrum of the solid. Another solution in transmission spectroscopy involves the formation of a powdered sample from the solid. The normal technique involves powdering the solid to as fine a powder as possible, and then mixing it intimately with a binder and forming a cell from the resultant paste. However, great care must be exercised with these powdered samples because of the particle scattering of the transmitted infrared radiation. Whenever there are present certain sizes of particles in the sample which bear certain relations to the wavelength of the radiation used, then the radiation will tend to be scattered rather than transmitted and so practically no output power will be available for detection, or, again, certain absorptions will occur which are not due to the mutual motions of the atoms within the sample molecules which is the interaction producing the useful absorption.

I have found a way of analyzing solid specimens by infrared spectroscopy which substantially eliminates the scattering and opacity problems enumerated above. Since both of these difficulties are associated with the transmission of the infrared beam directly through the specimen, in my invention I direct an infrared beam through a light pipe and provide the specimen in powdered form on the surface of the light pipe. As the infrared beam internally reflects off of the light pipe surfaces, it will actually penetrate the powdered specimen on the surface and an interaction can occur between the infrared radiation and the molecules of the specimen causing exactly the same kind of absorption spectrum that one will encounter had the specimen been capable of direct analysis in a transmission technique. The opacity of the solid is controlled by controlling the depth of penetration of the beam into the powder, as, for example, by altering the angle of incidence of the beam on the reflecting surfaces or the number of reflections.

The particle size of the powdered specimen apparently does not cause scattering of the radiation because the radiation is actually being conveyed by the light pipe rather than directly through the specimen.

My new technique greatly widens the variety of materials which can be investigated by infrared spectroscopy. The technique now becomes extraordinarily simple for the analysis of solids, completely eliminating the previous difficulties encountered in the preparation of samples. Now, the desired specimen need simply be ground up into powdered form without any special care being exercised for controlling the particle size, and the powder then simply brought into contact with the light pipe, such as by simple depositing the powder on the light pipe or immersing the light pipe in the powder. In this way, we have found it extremely simple to obtain satisfactory infrared spectra of solids which exhibited excellent resolution.

In accordance with a further feature of my invention, I have also found it possible to analyze solid aerosol samples in a similar technique by separating the particles from the aerosol by means of electrostatic precipitation. In a preferred form, I chose as my light pipe a semiconductive body to which an electrical potential can be applied and whose surface can thus be charged, and I use the semiconductor light pipe as an electrode in the precipitator system so that the charged particles from the aerosol deposit directly on the surface of the semiconductor light pipe and then can be directly subjected to infrared analysis by passing an infrared beam through the light pipe.

The invention will now be described in further detail with reference being had to the accompanying drawing, in which:

FIG. 1 is a schematic illustration of one form of suitable apparatus for carrying out the method of my invention;

FIG. 2 is a schematic view of one form of electrostatic precipitator.

The use of a light pipe for studying surface properties by absorption of infrared radiation has been described in detail in my paper published in the "Annals of the New York Academy of Sciences," vol. 10, article 3, pages 928–959 (Jan. 23, 1963), and some of the principles described therein also are applicable to the method of my present invention, and I hereby incorporate by reference the contents of the aforementioned paper and two of my earlier papers which appeared in "Physical Review Letters,"

Mar. 1, 1960, pages 224–226 and "Physical Review," vol. 124, No. 4, 1962, pages 1165–1170. Briefly, in these papers I disclose apparatus and a method suitable for the study of the physics and chemistry of surfaces by frustrated internal reflection. In these devices, infrared radiation is directed onto the end surface of an optical element cut at such an angle that the beam of radiation strikes a major surface thereof at an angle above the critical angle, so that total internal reflection occurs and the beam is internally reflected onto an opposed reflecting surface also at an angle above the critical angle so that total internal reflection occurs, and so on, and in this manner, the beam is propagated by multiple reflection through the entire optical element and exits from a surface thereof. I also disclose that near the critical angle, the radiation actually penetrates into the rarer medium, i.e., optically less dense, adjacent the optical element and that an interaction will occur between the radiation and, for example, impurities on the said surface within the depth of penetration at or near molecular resonance frequencies. This has now become known in the art as internal reflection infrared spectroscopy, previously known as frustrated multiple internal reflection spectroscopy. The term "frustrated" stems from the fact that the internal reflection is less than total or is frustrated by the absorption of some of the radiation in the less dense medium at the surface.

In my copending application, Ser. No. 287,239, filed June 12, 1963, now U.S. Patent No. 3,308,709, I describe new geometries of optical elements by which the angle of incidence and the number of reflections can be varied. Another copending application, Ser. No. 308,142, filed Sept. 11, 1963, now abandoned, describes further optical elements which are especially useful for analyzing liquid specimens. In particular, several of the elements described are so-called double-pass probes because the infrared radiation enters at one end and after passing through the light pipe twice exits at the same end but in a different direction.

The apparatus described in these prior applications, whose contents are hereby incorporated by reference, can be used in carrying out the method of the present invention, which is schematically illustrated in FIG. 1. As shown, the apparatus comprises an infrared source 1 for generating a beam of infrared radiation 2, a light pipe 3 arranged so that the infrared radiation can be internally multiply reflected from the surfaces thereof and thus be propagated through the optical element, and a detector 4 for measuring the intensity of the infrared radiation transmitted by the light pipe. The system also requires a monochromator, so that the infrared spectrum can be selectively scanned to obtain the desired absorption versus wavelength characteristic of the specimen. The monochromator can be provided either before or after the multiple reflection optical element or light pipe 3. For more sensitive or accurate studies, I prefer a double-beam arrangement (not shown) in which, with a common light source and detector, the infrared beam is alternately passed through the light pipe with the specimen and a reference light pipe without a specimen to produce a modulated output signal, which tends to eliminate errors inherent in the system geometry, a technique which has also been found useful in transmission measurements.

The apparatus illustrated in FIG. 1 may be used as follows. A sample of the unknown specimen or other substance whose infrared spectrum is desired, is obtained by simply reducing to powder a portion of the specimen. Any technique for pulverizing the specimen portion can be employed, such as a simple mortar and pestle. Fine powders are generally more desirable as more material will actually contact the surface of the light pipe 3, it being remembered that the infrared radiation interacts with material on the surface to a depth of only about one wavelength. If large grains are provided, it simply means that there will be areas of the light pipe surface that will not contain the sample material and thus the amount of interaction and the sensitivity will be reduced. No sieving or particle size sorting is necessary as no scattering problems are encountered. The powdered sample 5 is then simply deposited or dropped on a major surface of the light pipe, or the pipe immersed in the powder, the apparatus energized and the absorption spectrum recorded. If desired, the angle of incidence or the number of reflections can be altered to increase or reduce the interaction, as described in my earlier copending application. I have successfully reduced to practice this technique using a germanium plate as the light pipe in a modified Perkin-Elmer spectrometer (Model 12a Monochromator with NaCl prism). The germanium plate, in the form of a flat slab, had dimensions of 50 x 20 x 1 mm., and approximately 100 reflections took place in a double-pass arrangement similar to what is illustrated in FIG. 3 of my copending application, Ser. No. 308,142. For example, I have obtained the absorption bands in quartz powder using this technique. The spectrum exhibited extremely high contrast, i.e., there was no energy loss on either side of the main absorption band in the 8–10 micron region, which is in sharp contrast to conventional absorption and reflection spectroscopy of this material. It thus becomes clear that the small particles on the surface of the light pipe do not act as scattering centers for the internal reflected radiation as they do for transmission or external reflection techniques. In comparison, I have attempted to obtain the infrared spectrum of the same powder in a transmission arrangement. This was unsuccessful and it was not possible to pick out the known absorption bands. Similar results were obtained using a KRS-5 plate. The simplicity of this technique in comparison with the cumbersome methods previously required for solid specimens is remarkable.

The production of the powdered specimen while most conveniently accomplished by a powdering or grinding of a portion of the substance to be analyzed, is not well adapted for the analysis of dusts or solid aerosols, where tiny particles of the substance are suspended in a gas or vapor. We have nevertheless been able to analyze successfully such materials by separating the suspended particles from the carrier employing electrical precipitation. To achieve this, we provide an electrode system with which a corona discharge can be established in a sample of the gas, which causes the particles to become charged. Then, by appropriate biasing of a semiconductor light pipe, the charged particles can be attracted to a charged surface of the cell and thus will deposit thereon as a powder and can be analyzed in the manner previously described. A suitable apparatus is illustrated in FIG. 2. The aerosol spray was introduced into the electrostatic precipitator system through an orifice 10 in an enclosure 11 between an electrode system constituted of a fine tungsten anode wire 12, 10–20 mils in diameter, coaxially surrounded by a wire mesh cathode electrode 13. A voltage from a source 14 of approximately 8000 volts was established between these two electrodes resulting in a corona discharge and a charging of the particles suspended in the gas or aerosol. A light pipe 3 in the form of a germanium slab as described in the above-mentioned publications and patent applications was mounted on a rotating support 15 in the path of the particle flow. The germanium is substantially transparent to infrared radiation and is sufficiently conducting to support a charge. A negative potential from a source 16 of approximately 1000 volts was applied to the germanium cell through the support, and it was found that the particles 17 which assumed a positive potential were deposited on the negatively-charged exposed surface 18 of the germanium light pipe 3. The light pipe 3 can then be removed from the enclosure 11, as the particles 17 remain attracted to the surface, and placed within the spectrometer apparatus as illustrated in FIG. 1 for analysis. By this technique, we have been able to obtain the absorption spectrum of cigarette smoke and various other powders that were very finely divided and formed a suspension in the atmosphere.

It will be understood that the spectrometer optics with which these powder analyses can be obtained can widely vary and are not limited to the specific arrangements illustrated or described. The light pipes can have any form so long as total internal reflection of the beam is possible, and need simply be of a material which is sufficiently transparent to the infrared radiation in the range desired to minimize the useless bulk absorption of the beam. Thus, in addition to the materials previously described, AgCl and Si as well as other materials are useful. Any of the well-known detectors for infrared radiation can be employed in the apparatus. Single, double, or higher order pass cells can be employed. The means for recording the spectrum are well known in the art and needn't be further described.

Thus, it will be clear that while there have been described above certain forms and embodiments of my invention, variations thereof which fall within the spirit of the invention will be obvious to those skilled in the art.

What is claimed is:

1. A method for the infrared absorption analysis of an aerosol, comprising the steps of electrostatically charging the aerosol particles and directing them to an oppositely-charged semiconductive light pipe for infrared radiation causing the charged particles to deposit on a surface thereof, directing infrared radiation through the light pipe in such manner that the radiation impinges on the surface where the particles are deposited at an angle greater than the critical angle so that total internal reflection takes place except as frustrated by absorption of the radiation by molecules of the particles within approximately a wavelength of the surface, and then determining the spectral regions in which absorption of the infrared beam has occurred as a means of obtaining knowledge concerning the character of the aerosol.

2. A method as set forth in claim 1, wherein the aerosol is a solid aerosol, and the particles are charged by establishing a corona discharge in a sample of the aerosol.

References Cited

UNITED STATES PATENTS

| | | | |
|---|---|---|---|
| 1,067,974 | 7/1913 | Cottrell | 55—154 |

OTHER REFERENCES

CIC Newsletter, #14, September 1961; #15, January 1962; #17, July-August 1962, published by Connecticut Instrument Co., Wilton, Conn.

New Infrared Spectro. Techn. Bell Lab. Record, vol. 40, p. 62, February 1962. TK1B432.

JEWELL H. PEDERSEN, *Primary Examiner.*

F. L. EVANS, *Assistant Examiner.*

U.S. Cl. X.R.

55—154; 250—83.3; 350—96; 356—51, 96, 38